United States Patent [19]
Krieg

[11] 4,317,280
[45] Mar. 2, 1982

[54] POWER FEED APPARATUS FOR TOOLS

[75] Inventor: Adrian H. Krieg, Woodbridge, Conn.

[73] Assignee: Widder Corporation, Naugatuck, Conn.

[21] Appl. No.: 132,822

[22] Filed: Mar. 24, 1980

[51] Int. Cl.[3] .............................................. B23D 21/06
[52] U.S. Cl. ..................... 30/92; 30/166 A; 30/372
[58] Field of Search ............... 30/92, 94, 95, 96, 97, 30/272 R, 371, 372, 166 A, 166 R

[56] References Cited
U.S. PATENT DOCUMENTS

| 739,496 | 9/1903 | Kidder | 30/166 A |
| 3,822,471 | 7/1974 | Crowl | 30/92 |
| 3,834,019 | 9/1974 | Smeltzer et al. | 30/92 |
| 4,094,612 | 6/1978 | Krieg | 29/559 |

FOREIGN PATENT DOCUMENTS 1065266 1/1954 France ..................... 30/371

Primary Examiner—James L. Jones, Jr.
Attorney, Agent, or Firm—Kenneth J. Stempler

[57] ABSTRACT

Apparatus for cutting pipe and other objects in which a power saw is pressure fed to and through the pipe or object. The saw is mounted on a shaft and the entire saw and shaft assembly rotated by a power mechanism, such as a clock or coil spring, to feed the saw to and through the pipe.

5 Claims, 4 Drawing Figures

POWER FEED APPARATUS FOR TOOLS

SUMMARY OF THE INVENTION

This invention relates to power saws and more particularly to portable power hacksaws.

Portable power hacksaws enjoy widespread use because of their versatility and usefulness. They can be used in most any location and the shape of the workpiece to be cut is generally immaterial. They are particularly useful when installing or removing pipe from buildings or other installations in which the pipe is cut while in place.

All power tools pose risk to the operator. Power hacksaws held overhead by the operator, to one side, or in other generally uncomfortable positions, are even more of a hazard.

To decrease the danger, clamps have been developed and used, such as the clamp illustrated in U.S. Pat. No. 4,094,612, which attach to the workpiece and hold the power tool in position. However, the force needed to feed a power hacksaw to and through the workpiece must still be delivered by the operator. If the applied force is insufficient, the saw may chatter and the blade may snap. The operator, in applying muscle power to the saw, may slip and cut himself severely on the reciprocating blade. In certain applications, such as in gravitiless space or under water, the operator may not be able to develop sufficient support to apply the force needed to saw through a workpiece.

In accordance with the present invention, mounting means are provided for the hacksaw along with means which can act on the mounting means or the hacksaw to rotate the saw to and through the body of the workpiece. The mounting means may, if desired, be secured to a clamp similar to the clamp shown in U.S. Pat. No. 4,094,612 or directly to a fixed reference. The clamp, being portable to any location, is a particularly useful mount for the apparatus of this invention.

For best results, the hacksaw is mounted on a shaft and rotates with it. The shaft in turn is rotatably placed in a mount, such as a pipe clamp, and a spring or other force or torque delivery system is mounted between the shaft and the clamp to apply torque to the shaft upon demand. Preferred is a clock spring which, when wound, stores sufficient energy to rotate the shaft and motor through a rather large arc with little loss in the magnitude of the torque applied. In addition, the mechanical nature of the clock spring lends itself to use in locations where external power may not be readily available to drive more than the hacksaw itself.

The apparatus is universal in its application to power hacksaws and can be used with pneumatically operated tools, such as rotary valve, turbine or piston driven power hacksaws, electrically driven hacksaws, hydraulic or hi-cycle hacksaws.

Referring now to the drawings, in which a preferred embodiment of the invention is illustrated, and where like numerals refer to like parts:

FIG. 4 is a sectional view taken along line 4—4.

Figure 1:
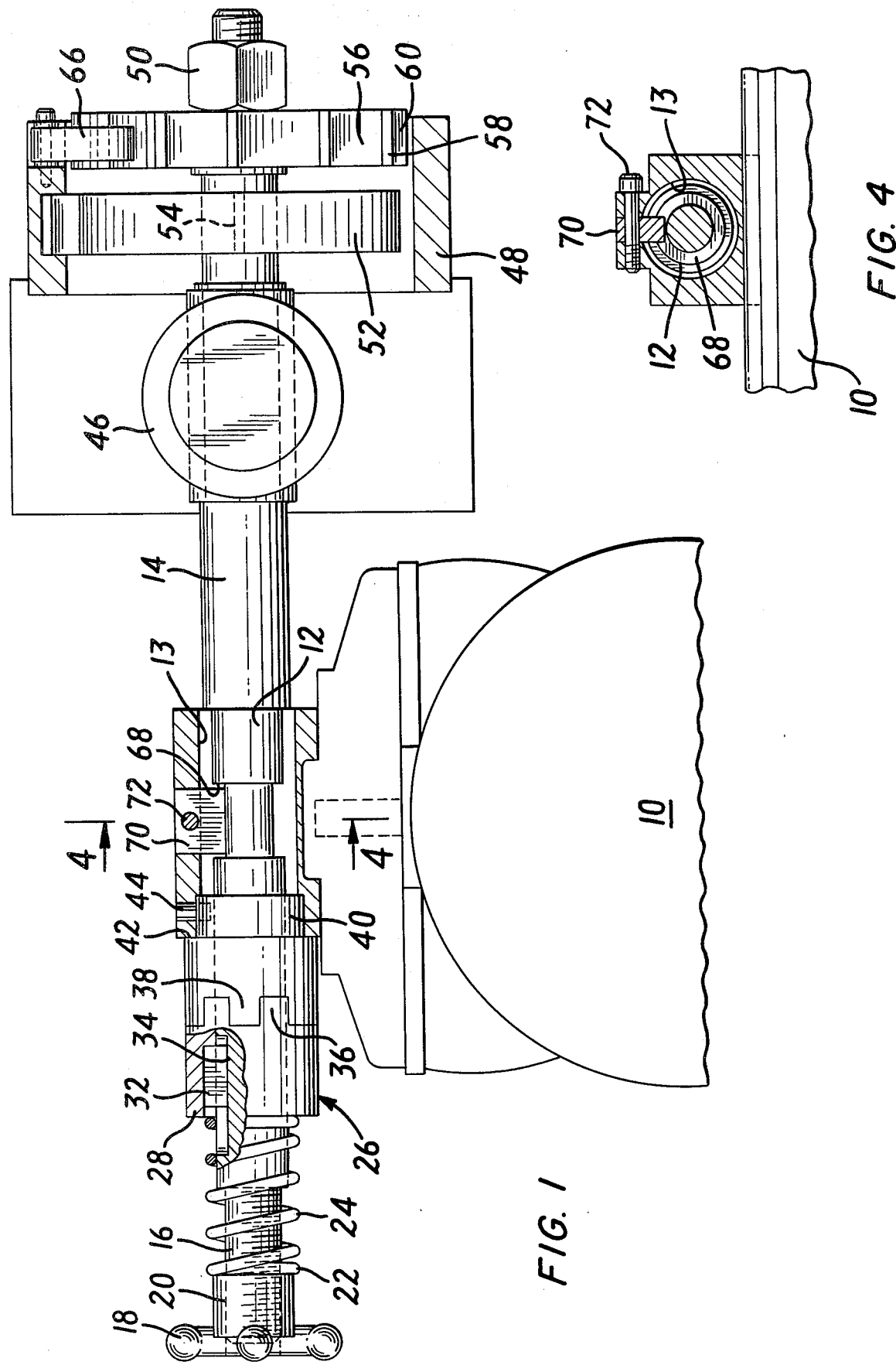
FIG. 1 is a detail plan view of the apparatus of the instant invention.
Figure 2:
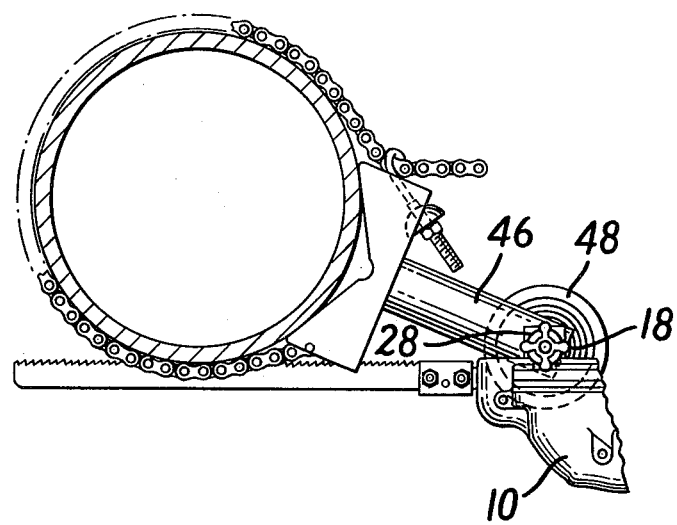
FIG. 2 is another plan view of the apparatus of FIG. 1.
Figure 3:
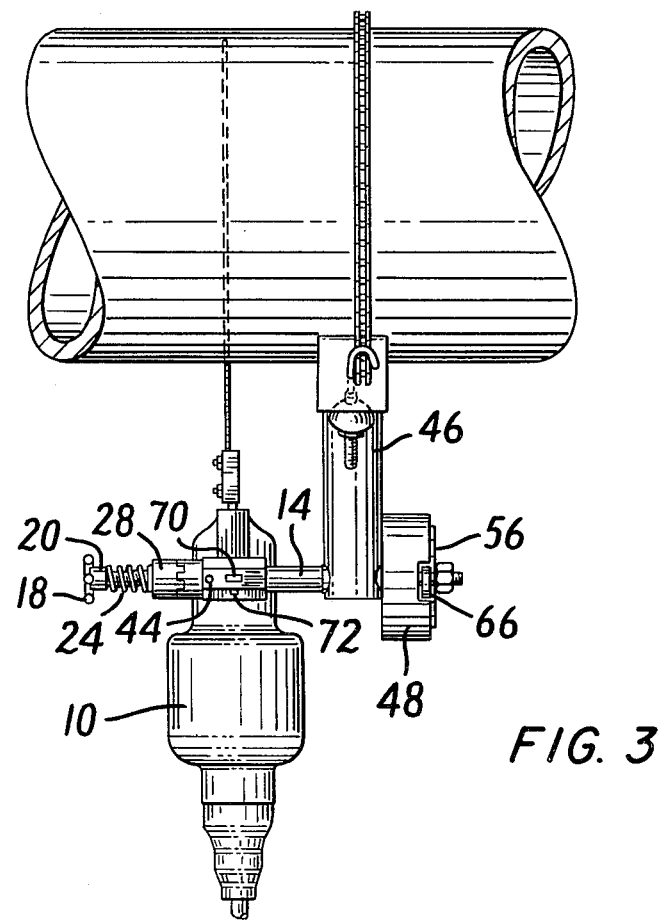
FIG. 3 is a side view of the apparatus of FIG. 1.

In the drawings, numeral 10 denotes a portable power hacksaw having a block 12 at its rear surface. The block 12 may either comprise a part of the housing for the saw or it can be made separately and welded, tacked, screwed or otherwise conventionally affixed to the saw body. Block 12 is provided with a bore 13 which extends through the block.

Block 12 is journalled on a shaft 14 which has an outer diemater smaller than the diameter of the bore 13. Starting from the left as viewed in FIG. 1, the shaft 14 is provided with a relatively small diameter end 16 on which a removable cap 18 is mounted through the medium of cooperating screw threads in the cap and shaft. Cap 18 is provided with a body 20 which forms a support shoulder 22 for a spring 24. The other end of the spring abuts against a clutch assembly 26.

Clutch assembly 26 comprises a pair of clutch parts 28 and 30. Clutch part 28 is provided with means, such as rib 32, which extends radially toward shaft 14 a distance sufficient to engage keyway 34 provided in the surface of the shaft. Rib 32, which may be replaced by a pin, dowel or tubular extension (not shown) is shorter in length than keyway 34, provides a driving connection between the shaft and clutch part and also permits the clutch part to slide axially on the shaft.

Clutch part 22 is provided with a plurality of teeth 36 which cooperate with teeth 38 on clutch part 30. Part 30, which is also mounted on shaft 14, is provided with a reduced diameter portion or plug 40 which fits within the bore 13. The shoulder 42 on clutch part 30 serves to locate it against block 12, to which it is secured conventionally by a screw denoted by the numeral 44 in the drawing. If desired, other types of clutches may be employed, such as a friction plate clutch or an electric clutch if desired.

Shaft 14 is rotatably mounted or journalled in a stanchion or pipe 46 which is, in turn, mounted to a fixed frame of reference. In the apparatus illustrated, pipe 46 is secured to a plate assembly which in turn is secured directly to the object which is to be cut by the saw, the combination of plate and object serving as the fixed frame of reference.

Affixed to pipe 46 is a housing 48 through which the shaft 14 passes. The end of shaft 14 is secured by a nut 50. Mounted in the housing is a clock spring 52 which has one end affixed to shaft 14 by conventional means, such as by inserting the end into a receiving slot 54 in the shaft, or by welding the end of the spring to the shaft. The other end of the clock spring is affixed to the housing, also by conventional means, preferably welding. Adjacent the clock spring and mounted within the housing is a ratchet wheel 56 containing a plurality of teeth 58, sloped on one side and essentially straight on the other, and thus cooperating with pawl 60 to allow rotation of the ratchet wheel in one direction only.

In operation, shaft 14 is rotated by the operator either with a wrench applied to nut 50 or a power tool, such as a pneumatic wrench commonly employed by auto mechanics. Ratchet wheel 56 permits rotation in one direction and the result of the rotation is to wind clock spring 52, storing energy therein for later use.

As described above, shaft 14 is rotatable in block 12. However, clutch part 28 is connected to the shaft and, when the clutch assembly is in the condition illustrated in FIG. 1, with the assembly operative, rotation of shaft 14 will, through clutch part 28, transfer this rotary motion to block 12 and the saw to which the block is attached. As it is not desirable to so rotate the saw when winding the clock spring, the clutch parts are disengaged from each other either by backing off cap 18 thus decreasing the force applied by the spring 24 to the clutch part 28, then disengaging the clutch parts by hand, or by removing the cap and then moving clutch part 28 to the left to disengage it from clutch part 30. With the clutch parts disengaged, shaft 14 may be rotated to wind the clock spring 52 without also rotating block 12 for the saw 10.

With the clock spring wound up, pawl 60 is set to prevent reverse motion. Cap 18 is secured and the clutch parts engaged, and the apparatus is ready for use.

The clamp is then placed on, for instance, a pipe. When properly positioned on the pipe to be cut, the pawl 60 is released and the clock spring 52 slowly begins to unwind, releasing stored energy and in the process rotating the shaft and the power hacksaw to and through the pipe to be cut.

The pawl may comprise a finger of metal rotatably mounted in the front face of the housing.

The pawl may be rotated to the position shown to engage the ratchet, and then rotated to a neutral position away from the ratchet teeth, thus permitting the clock spring to unwind. Other methods and apparatus know to those of ordinary skill in the art may be employed to retain the ratchet wheel and release it upon demand.

The clock spring may, if desired, be replaced by a coil spring mounted inside shaft 14, one end of which is connected to the shaft, the other of which is connected to a housing or similar fixed reference. Like the clock spring, the coil spring is wound to store energy. It may be held in the wound position by providing the shaft with a series of depressions on its surface and a pawl or similar mechanism employed to retain the shaft in the position to which it is rotated, thus storing the energy imparted to the coil spring for release upon demand.

Still further, a leaf spring may be employed in place of the clock spring, one end of the leaf spring being connected to the saw body 10 and the other to a fixed reference, such as a pipe clamp. Other and further methods of storing energy may be employed.

In most applications, the saw will have to traverse a cutting arc of less than 180°. In other words, from beginning to end, the saw will traverse less than half a revolution. With a clock spring wound through at least three or four shaft revolutions, the energy stored will in most cases be sufficient to apply a reasonably constant torque to the shaft during cutting, thus tending to assure a reasonably smooth feed of the saw to and through the pipe to be cut. Because of the relative constancy of the applied force, chatter is reduced or eliminated and stresses on the blade are beneficially maintained at a fairly constant level.

For best results, the hacksaw is positioned on the shaft, and this position maintained by grooving the circumference of shaft 14 as illustrated in FIG. 1 and denoted by the numeral 68. A key or rib 70 is removably secured to block 12 by conventional means such as set screws 72 which engage the rib on an angle.

Groove 68 extends about the circumference of shaft 14 and, with key 70, serves to laterally locate the block 12, and the saw, on the shaft 14. The key 70 does not interfere with the rotation of the shaft which occurs when the clock spring is wound, as it rides in a circumferential groove provided for this purpose.

Other modifications may occur to those of ordinary skill in the art. It is intended to cover all such modifications which fall within the spirit and scope of the invention as defined in the claims appended hereto.

What I claim is:

1. Apparatus for power feeding a tool comprising a shaft, means for mounting said tool to said shaft, energy storage means connected to said shaft and to a fixed reference, clutch means on said shaft and the tool mounting means, said clutch means being operative to drivingly engage said tool and said shaft and disengageable to permit said shaft to rotate with respect to said tool mounting means.

2. Apparatus according to claim 1 wherein said tool is a power portable hacksaw.

3. Apparatus according to claim 1 wherein said energy storage means is a clock spring capable of being wound upon rotation of said shaft when said clutch means are disengaged, means for releasably retaining the clock spring in the wound condition, said clutch means being engaged upon release of said clock spring to connect said shaft to said tool to power feed the tool to an object.

4. Apparatus according to claim 3 wherein said clutch means comprises first and second clutch parts, said first clutch part being slidably mounted on said shaft and rotatably engaged with said shaft, said second clutch part being fixedly mounted on said tool mounting means and rotatably mounted on said shaft, whereby when said clutch parts are disengaged, the shaft rotates freely with respect to said tool mounting means and when said clutch parts are engaged, the shaft and tool mounting means rotate together.

5. Apparatus according to claim 3 wherein said fixed reference is a pipe clamp.

* * * * *